(12) United States Patent
Sitbon

(10) Patent No.: US 9,530,106 B2
(45) Date of Patent: Dec. 27, 2016

(54) SYSTEM AND METHOD FOR DIGITAL MULTI-LATERAL PROOFREADING DURING A MEETING

(75) Inventor: David Eduard Sitbon, Beer Sheva (IL)

(73) Assignee: U-SEE 2 LIMITED, Limassol (CY)

( * ) Notice: Subject to any disclaimer, the term of this patent is extended or adjusted under 35 U.S.C. 154(b) by 1095 days.

(21) Appl. No.: 12/521,721

(22) PCT Filed: Dec. 31, 2007

(86) PCT No.: PCT/IL2007/001631
§ 371 (c)(1),
(2), (4) Date: Feb. 23, 2010

(87) PCT Pub. No.: WO2008/081440
PCT Pub. Date: Jul. 10, 2008

(65) Prior Publication Data
US 2010/0156756 A1     Jun. 24, 2010

(30) Foreign Application Priority Data
Jan. 1, 2007    (IL) .......................................... 180477

(51) Int. Cl.
*G06Q 10/00*    (2012.01)
(52) U.S. Cl.
CPC ..................... *G06Q 10/00* (2013.01)
(58) Field of Classification Search
CPC ...................................................... G06Q 10/00
See application file for complete search history.

(56) References Cited

U.S. PATENT DOCUMENTS

| 5,767,897 A | 6/1998 | Howell |
| 5,796,577 A | 8/1998 | Ouchi et al. |
| 5,856,819 A * | 1/1999 | Vossler .......................... 345/102 |
| 6,259,038 B1 | 7/2001 | Sakaguchi et al. |
| 6,295,038 B1 * | 9/2001 | Rebeske ......................... 345/1.1 |

(Continued)

FOREIGN PATENT DOCUMENTS

| DE | 3315025 A1 | 11/1983 |
| EP | 1134645 A1 | 9/2001 |

(Continued)

*Primary Examiner* — Amr Awad
*Assistant Examiner* — Andre Matthews
(74) *Attorney, Agent, or Firm* — Marsteller & Associates, P.C.

(57) ABSTRACT

A digital multi-lateral system and method for proofreading a composition during a meeting. The system comprises a multi-screened monitor unit having a first screen and at least one oppositely facing second screen mounted in a common housing, images of a selected composition being viewable simultaneously on the first screen and the at least one second screen, a computer coupled to the monitor unit and provided with a dedicated software module for interfacing with the monitor unit, one or more primary and secondary co-author input devices, and means for transmitting signals generated by each co-author input device to the computer. Correction data is transmitted by a co-author input device to the computer, which transmits corrected image data simultaneously to the first and second screens. In one embodiment, the monitor unit receives VGA data and USB video data from the computer and transmits the same to the first and second screens, respectively.

26 Claims, 9 Drawing Sheets

(56) References Cited

U.S. PATENT DOCUMENTS

| | | | |
|---|---|---|---|
| 6,487,068 B1 * | 11/2002 | Rahemtulla | 361/679.04 |
| 6,624,797 B1 * | 9/2003 | Wheeler et al. | 345/1.2 |
| 6,670,950 B1 | 12/2003 | Chin et al. | |
| 6,778,383 B2 | 8/2004 | Ho | |
| 6,917,348 B2 | 7/2005 | Demsky et al. | |
| 7,675,479 B2 | 3/2010 | Jung | |
| 2001/0054986 A1 | 12/2001 | Leman | |
| 2002/0109662 A1 | 8/2002 | Miller | |
| 2002/0135584 A1 * | 9/2002 | Lee | 345/531 |
| 2004/0051679 A1 | 3/2004 | Ponx | |
| 2004/0075638 A1 * | 4/2004 | Han | 345/156 |
| 2004/0113935 A1 | 6/2004 | O'Neal et al. | |
| 2005/0237269 A1 | 10/2005 | Connor et al. | |
| 2006/0104289 A1 * | 5/2006 | Lee | 370/400 |
| 2010/0177016 A1 | 7/2010 | Zeng | |

FOREIGN PATENT DOCUMENTS

| | | |
|---|---|---|
| EP | 1420336 A | 5/2004 |
| GB | 2153189 A | 8/1985 |
| WO | 0163396 A1 | 8/2001 |
| WO | 0175583 A1 | 10/2001 |
| WO | 2004049580 A2 | 6/2004 |
| WO | WO2005/067479 A | 7/2005 |
| WO | 2006069445 A1 | 7/2006 |

\* cited by examiner

SYSTEM AND METHOD FOR DIGITAL MULTI-LATERAL PROOFREADING DURING A MEETING

FIELD OF THE INVENTION

The present invention relates to the field of display systems. More particularly, the invention relates to a system and method for digital multi-lateral proofreading during a meeting.

BACKGROUND OF THE INVENTION

During the course of many meetings, a contract is verbally agreed upon and needs to be reviewed and proofread by the two sides before being signed. Valuable meeting time is lost as the contract is printed and then distributed to the two sides. If one of the sides disagrees with the wording of the contract, the contact has to be corrected by a word processor, reprinted, and redistributed to the participants.

The present device provides a novel system and method for the digital proofreading of contracts during the course of a front-to-front meeting by the use of a dual screen computer monitor, to more efficiently utilize meeting time.

Many computers having two display screens are known from the prior art. For example, U.S. Pat. No. 5,796,577 and U.S. Pat. No. 5,856,819 disclose a bi-directional presentation device having a pair of screens facing in generally opposite directions, for displaying an image visible to an audience on both sides of the display device. US 2002/0109662 discloses a dual screen computer display consisting of two display panels which may face in opposite directions or in the same direction to provide an enlarged viewing area. U.S. Pat. No. 6,295,038 and US 2004/0051679 disclose a laptop computer having a first display screen that can be observed by an operator and a second display screen hingedly secured to the first screen, by which an observer of a presentation can see the same information viewed by the operator.

An image is usually generated by the operator so that it may be viewed by a person participating in a front-to-front meeting. The applicant is unaware of any prior art references that describes the ability of two participants of a meeting to interact with a display, particularly a textual display, without having to add any hardware to the personal computer in use.

It is an object of the present invention to provide a system and method for the digital bilateral proofreading of a contract during a meeting.

It is an additional object of the present invention to provide a system and method for the digital bilateral correction of a misworded contract during a meeting.

It is an additional object of the present invention to provide a system and method by which participants of a meeting may interact with a textual display without having to add any hardware to the personal computer in use.

Other objects and advantages of the invention will become apparent as the description proceeds.

SUMMARY OF THE INVENTION

The present invention provides a device and method fox the digital multi-lateral proofreading of a composition during a meeting with use of multi-screened computer monitors. As referred to herein, a "computer monitor unit" is a set of monitors disposed on a common surface, e.g. a desk of a co-author, on each of which can be displayed computer generated images. The images that are displayed on each screen of the same computer monitor unit are generally identical. A computer monitor unit may include screens, e.g. two or three, that are in communication with corresponding video ports of the same computer.

The type of multi-screened computer monitor units that is used in conjunction with the present invention is one that has oppositely facing screens and an input device for each corresponding screen. The term "oppositely facing screens" means two screens disposed at a relative angular spacing ranging from approximately 60-180 degrees. Since co-authors are provided with corresponding input devices and can simultaneously view images displayed on oppositely facing screens of a multi-screened computer unit, a co-author can correct the composition while discussing the content of the composition with a fellow co-author. A discussion between co-authors concerning the content of a composition will be called a "meeting".

Two screens of the monitor unit will be referred herein as the "first side" and the "second side", respectively, or alternatively, as the "agent screen" or the "client screen", respectively. A co-author located at the first side will be called a "primary co-author", and a co-author located at a second side will be called a "secondary co-author". When the monitor unit has three screens, there may be two second sides.

A "composition" is a text or a collection of other visible information which is displayable on a screen of a computer monitor unit, e.g. a literary work, an agreement such as a contract, a transcript of a court proceeding, a drawing, a game, a seating arrangement within an airplane which is displayed to a passenger at a check-in counter, a bank statement, and a sale slip. When said composition is displayed on said screen, an action for revealing and correcting mistakes in the composition, such as misprints, inaccurate statements, or deleted statements, will be called "digital proofreading". When the composition is proofread by more than one co-author as each co-author views the composition on a corresponding screen of the monitor unit during the course of a meeting, the action will be called "multi-lateral proofreading".

A "co-author" is one who is involved with multi-lateral proofreading, and is not necessarily the one who originally drafted, or was involved in the drafting of, the composition. When the composition is an agreement such as a contract or a sale slip by which the seller agreed to sell a product, the primary co-author will be called the "grantor" and the secondary co-author will be called the "grantee". The grantor has priority in terms of correcting the composition, and can prevent the grantee from correcting the composition, if so desired.

Accordingly, a digital multi-lateral proofreading system during a meeting comprises:
  a) a multi-screened monitor unit having a first screen and at least one oppositely facing second screen mounted in a common housing, images of a selected composition being viewable simultaneously on said first screen and said at least one second screen;
  b) a computer coupled to said multi-screened monitor unit and provided with a dedicated software module for interfacing with said monitor unit;
  c) one or more primary co-author input devices by which a primary co-author is able to perform a proofreading operation while viewing said composition on said first screen, said one or more primary co-author input devices being coupled to said computer;
  d) one or more sets of secondary co-author input devices by which a corresponding secondary co-author is able to perform a proofreading operation while viewing said composition on a corresponding second screen during a meeting with the primary co-author; and e) means for transmitting signals generated by each of said secondary co-author input devices to said computer, wherein correction data is transmittable from said one or more primary co-author input devices to said computer, or from said one or more secondary co-author input devices to said computer, wherein said computer is adapted to generate corrected image data in response to said transmitted correction data and to transmit said corrected image data simultaneously to said first and second screens.

In one aspect, the multi-screened monitor unit is a kit which is releasably coupleable with a computer. A multi-lateral proofreading operation may therefore be performed without having to change the hardware of the computer.

In one aspect, the system further comprises means for preventing an agent input device and a client input device to operate simultaneously during a multi-lateral proofreading operation.

In one aspect, the monitor unit comprises a controller which is in data communication with the computer, for converting signals generated by an input device into USB signals.

In a preferred embodiment, the multi-screened monitor unit comprises means for receiving VGA data from the computer and for transmitting the same to the first screen, and means for receiving USB video data and for transmitting the same to each of the second screens, images associated with said transmitted VGA data and with said transmitted USB video data being simultaneously displayable on said first and second screens, respectively.

The multi-screened monitor unit further comprises a control module for controlling the flow of USB control and video data received from the computer, a switch module for delivering video data to a client side in response to the operation of the control module, a video splitter for splitting received VGA data into a first portion transmitted through a first line to the first screen and into a second portion transmitted through a second line to said switch module, a first USB segment extending from said control module to said switch module, and a second USB segment extending from said switch module to the second screen.

In one aspect, the system further comprises means for identifying each of the co-authors.

In one aspect, the system further comprises an authentication server with which the computer is in data communication, for authenticating a co-author identification.

In one aspect, the system further comprises means for disabling a proofreading operation if a co-author identification is not authenticated.

In one aspect, the system further comprises means for attaching a digital signature to an approved composition.

In one aspect, a primary or secondary co-author input device is an input device which is external to the monitor unit, such as a keyboard, a mouse, and an electronic pen.

In one aspect, a primary or secondary co-author input device is an input device which is integral with the monitor unit, such as a touch screen, a credit card reader, or a biometric reader.

In one aspect, a secondary co-author input device is coupled to the monitor unit.

In one aspect, a secondary co-author input device is coupled to the computer.

In one aspect, a secondary co-author input device is in wireless communication with the computer.

In one aspect, the transmitted corrected image data is a displayed feature of the composition which is indicated by means of a touch screen.

In one aspect, the computer is in communication with a data network.

The present invention is also directed to a method for the digital multi-lateral proofreading of a composition during a meeting, comprising:

a) providing a multi-screened monitor unit having a first screen and at least one oppositely facing second screen mounted in a common housing;

b) coupling said monitor unit to a computer;

c) simultaneously viewing images of a selected composition during a meeting by a co-author on each corresponding screen of said monitor unit;

d) one of said co-authors performing a proofreading operation whereby correction data is transmitted from an input device to said computer;

e) generating corrected image data in response to said transmitted correction data; and f) transmitting said corrected image data simultaneously to said first and second screens.

In one aspect, all client input devices are disabled for a predetermined period of time after an agent has performed a proofreading operation, and all agent input devices are disabled for a predetermined period of time after a client has performed a proofreading operation.

In one aspect, a primary co-author sets a secondary co-author input device to a disabled mode.

In one aspect, the monitor unit operates in an agent only mode, a uniform mode whereby the agent side screen and client side screen both display the same images, or in a dual mode, whereby in the dual mode the agent side screen displays images corresponding to received video graphics array (VGA) data and the client side screen displays images corresponding to received universal serial bus (USB) data.

The present invention is also directed to a multi-screened computer monitor unit capable of being coupled to a computer, comprising:

a) a first screen;

b) at least one oppositely facing second screen;

c) a control module for controlling the flow of USB control and video data received from a computer;

d) a switch module for delivering video data to each of said second screens in response to the operation of said control module;

e) a video splitter for splitting received VGA data into a first portion transmitted through a first line to said first screen and into a second portion transmitted through a second line to each of said switch modules;

f) a first USB segment extending from said control module to each of said switch modules;

g) a second USB segment extending from each of said switch modules to a corresponding second screen;

h) means for selecting a desired mode of operation, corresponding USB control data being transmittable to said control module upon selection of the desired mode of operation;

i) for each corresponding second screen, a set of one or more input ports to each of which a client input device is coupled; and j) for each corresponding second screen, a set of one or more output ports in communication with a corresponding input port, from each of said output ports is transmittable USB signals generated by a client input device, wherein said control module is adapted to generate a disable signal and to transmit the same to said switch module during an agent only mode to suppress the transmission of the VGA data via said second line, wherein said control module is adapted to generate an enable signal and to transmit the same to said switch module during a uniform mode to enable the transmission of the VGA data via said first and second lines simultaneously, wherein said control module is adapted to generate a disable signal and to transmit the same to each of said switch modules during a dual mode, the USB video data being transmittable via the first USB bus segment and each of second USB bus segments to each of said corresponding second screens, respectively, images associated with said VGA data and with said USB video data being simultaneously displayable on said first and second screens, respectively.

In one aspect, the first screen is stationary and the second screen is displaceable.

In one aspect, the second screen is angularly spaced from the first screen.

Preferably, the multi-screened monitor unit further comprises means for selecting a desired mode of operation, corresponding USB control data being transmittable to the control module upon selection, of the desired mode of operation.

The control module generates a disable signal and transmits the same to the switch module during an agent only mode to suppress the transmission of the VGA data via the second line.

The control module generates an enable signal and transmits the same to the switch module during a uniform mode to enable the transmission of the VGA data via the first and second lines simultaneously.

The control module generates a disable signal and transmits the same to the switch module during a dual mode, the USB video data being transmittable via the first and second USB bus segments to the client side.

DETAILED DESCRIPTION OF PREFERRED EMBODIMENTS

The present invention is a novel system and method for the digital review and correction (hereinafter referred to as "proofreading") of a composition displayed on each screen of a multi-screened computer monitor unit during the course of a meeting between co-authors of the composition. A meeting may be a front-to-front discussion or conferral between an agent of an establishment, such as a salesman or a bank clerk, and a client or potential client of that establishment, or between a grantor and grantee of an agreement. A meeting may also be conducted among many participants; however, only those participants who have privileges to correct the composition by means of a dedicated user interface, as will be described hereinafter, will be called a "co-author".

Each co-author views, and interfaces with, a corresponding screen of a monitor unit, such as a dual screened monitor unit, by which oppositely facing screens may present a composition of graphical or other visible information simultaneously to each of the co-authors. The composition is generally relevant to the nature of the meeting. Thus a secondary co-author on a second side of the monitor unit is able to view images of the composition without having to lean, while sitting, in an awkward position over the table supporting the monitor unit in order to view the first side thereof. The secondary co-author is also able to proofread the composition without having to wait for the primary co-author to print the composition, distribute the printed pages to the other co-authors, and request the primary co-author to correct the composition.

Figure 1:
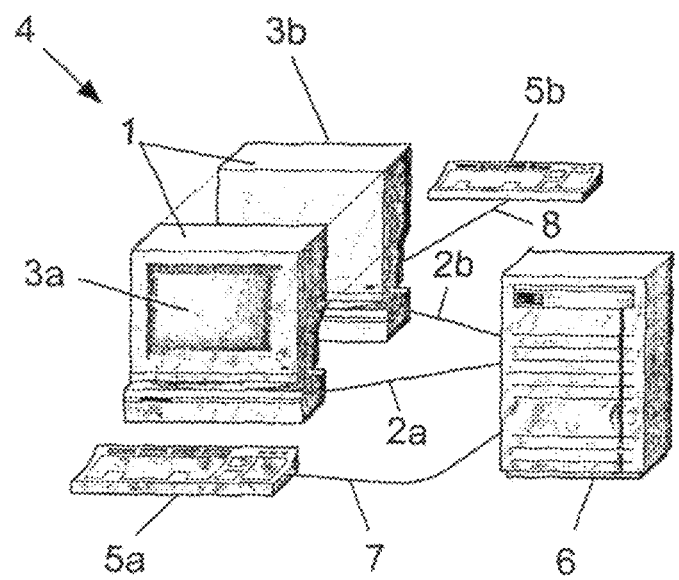
FIG. 1 is a perspective view of one embodiment of a computer monitor unit comprising two oppositely facing screens mounted in a common housing and in communication with a common computer.

FIG. 1 illustrates one embodiment of a multi-screened computer monitor unit, which is generally designated by numeral 4. Monitor unit 4 comprises two screens 3a and 3b which face in opposite directions, i.e. an angular spacing of 180 degrees, and two input devices 2a and 2b, respectively, e.g. keyboards as shown. Monitor unit 4 is essentially a unique interactive device, as will be described hereinafter, and is adapted to be coupled to computer 6 and therefore may be sold as a kit. The first side screens 3a and the second side screen 3b are mounted in a common housing 1, which is schematically shown in exploded fashion. Each screen may be of any desired configuration, such as a CRT or LCD. Computer 6 generates two identical sets of images which are displayed simultaneously on screens 3a and 3b, respectively, by means of cables 2a and 2b, respectively, or by any other suitable data transmission medium. As is conventional with all computers, a single input device 5a is coupled to computer 6 by cable 7, and a co-author viewing the images displayed on screen 3a is therefore able to proofread the displayed images by means of input device 5a. Input device 5b, however, is coupled directly to screen 3b by cable 8, and a co-author viewing the images displayed on screen 3b is therefore able to proofread the displayed images by means of input device 5b and the system which will be described hereinafter.

Figure 2:
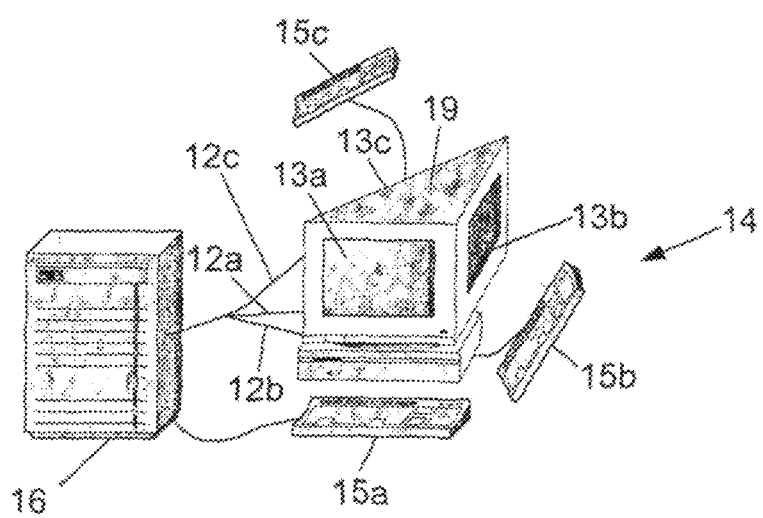
FIG. 2 is a perspective view of another embodiment of a computer monitor unit which comprises three screens mounted in a common triangularly shaped housing and in communication with a common computer.

FIG. 2 illustrates a monitor unit 14 comprising three screens 13a-c mounted in a common triangular housing 19 and angularly spaced by an angle of 60 degrees, and computer 16. Computer 16 generates three sets of images which are displayed on screens 13a-c, respectively, by means of cables 12a-c, respectively, or by any other suitable data transmission medium. Three co-authors are able to proofread the images displayed on screens 13a-c by means of input devices 15a-c, respectively. It will be appreciated that a monitor unit may employ any other desired number of screens.

Figure 6:
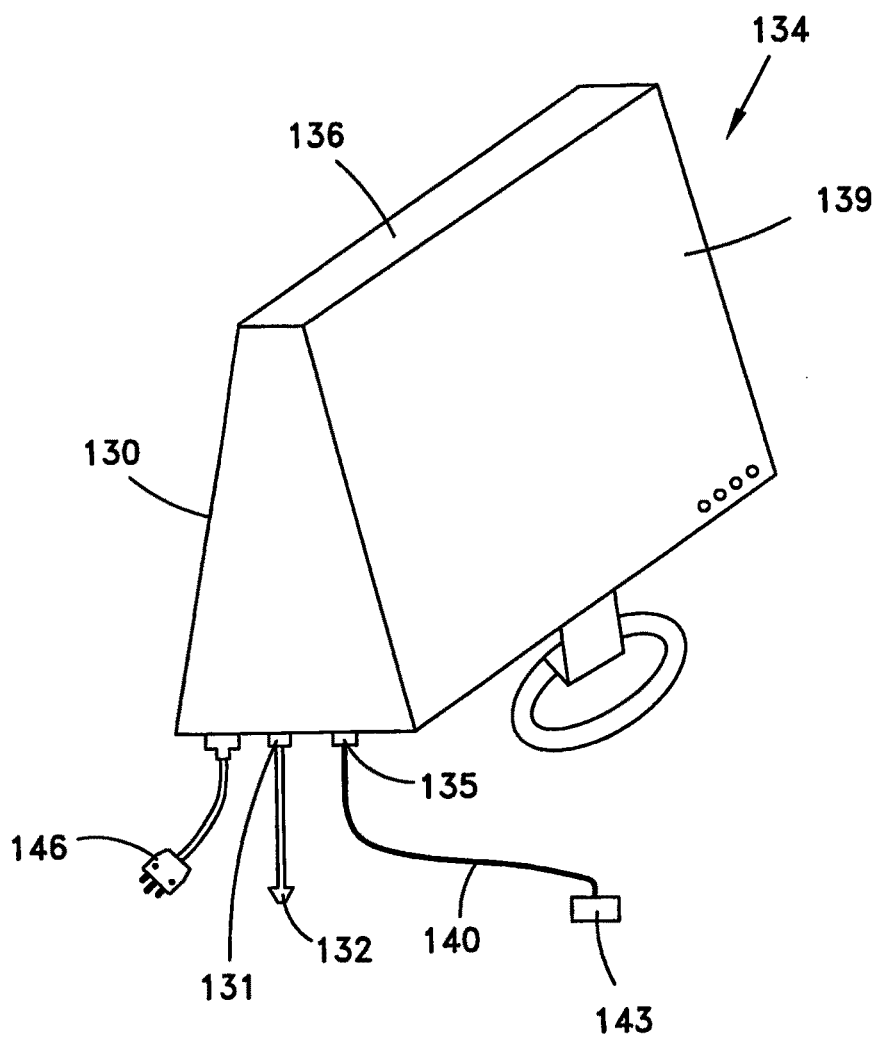
FIG. 6 is a perspective view of another embodiment of a computer monitor unit comprising two oppositely facing screens.

Alternatively, a multi-screened computer monitor unit 134 illustrated in FIG. 6, may comprise two screens 130 and 139 which face in opposite directions and which are mounted obliquely with respect to top surface 136 of the monitor unit.

Figure 7:
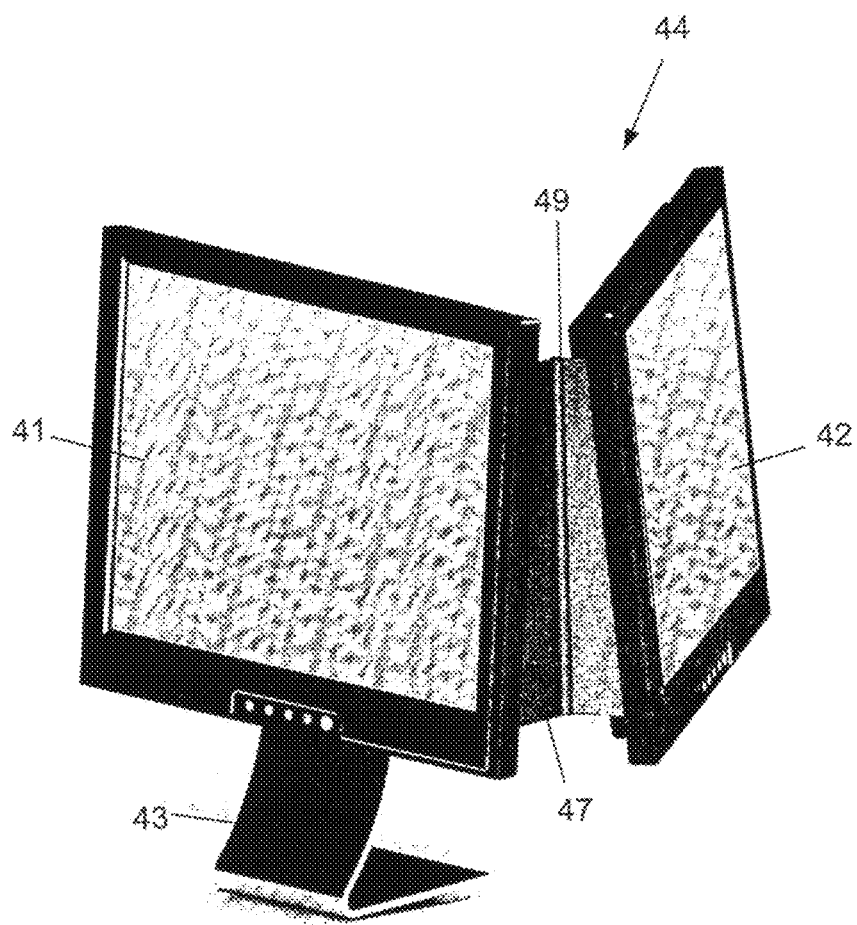
FIG. 7 is a perspective view of another embodiment of a computer monitor unit comprising a first stationary screen and a second displaceable screen.

FIG. 7 illustrates a monitor unit 44 which comprises a first stationary screen 41 and a second displaceable screen 42. Stationary screen 41 is supported by an underlying stand 43, which may be V-shaped as shown or configured in any other desired shape. A connecting element 47 extends from first stationary screen 41 to second displaceable screen 42, and is provided with a vertical pivot 49. By virtue of the pivotal screen 42 which may oriented at an angular distance of approximately 90 degrees, as illustrated, or any other convenient angular distance, from stationary screen 41, the participant may confer with the agent in a front-to-front meeting without interference from screen 42. However, during a lull period when the agent is involved in another activity, the participant may advantageously rotate second screen 42 about pivot 49 until the images displayed thereon are visible to the participant. A flexible cable (not shown) through which data is transmitted to screen 42 may be contained within connecting element 47.

Figure 8:
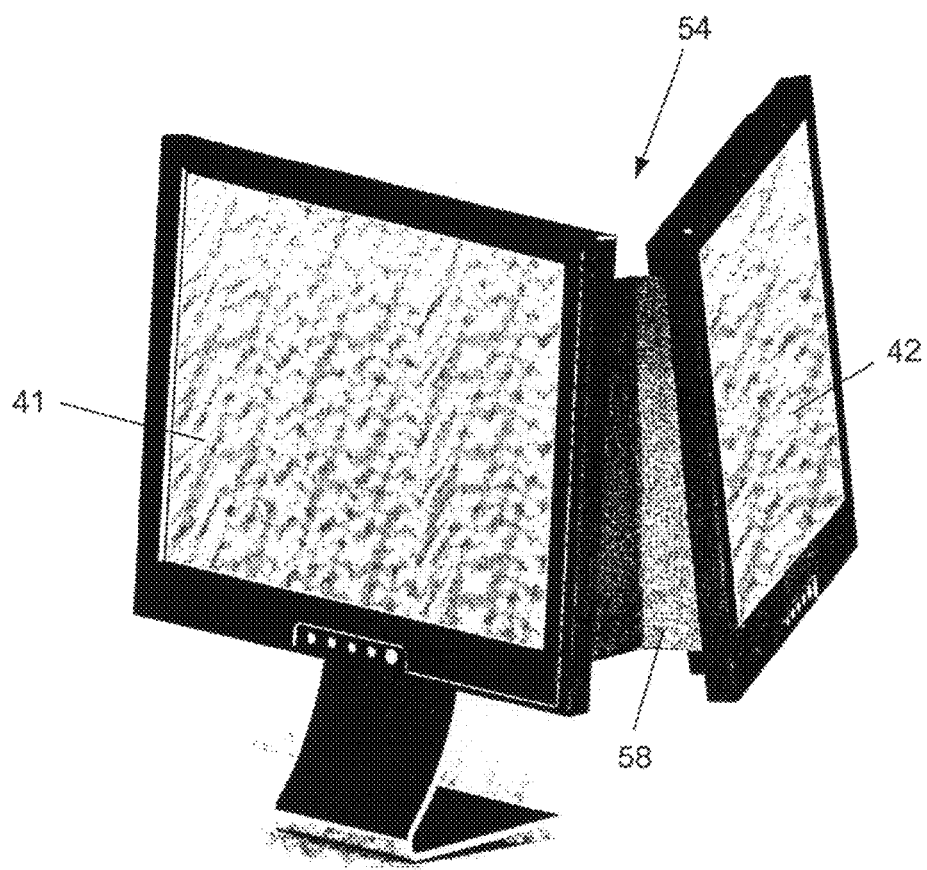
FIG. 8 is a perspective view of another embodiment of a computer monitor unit comprising two stationary screens that are separated by a fixed angular distance.

In FIG. 8, monitor unit 54 comprises a fixed connecting element 58 between screens 41 and 42. A client may sit at an angle of approximately 90 degrees from the agent and view a display of images while conferring with, or while waiting to confer with, the agent.

Figure 9:
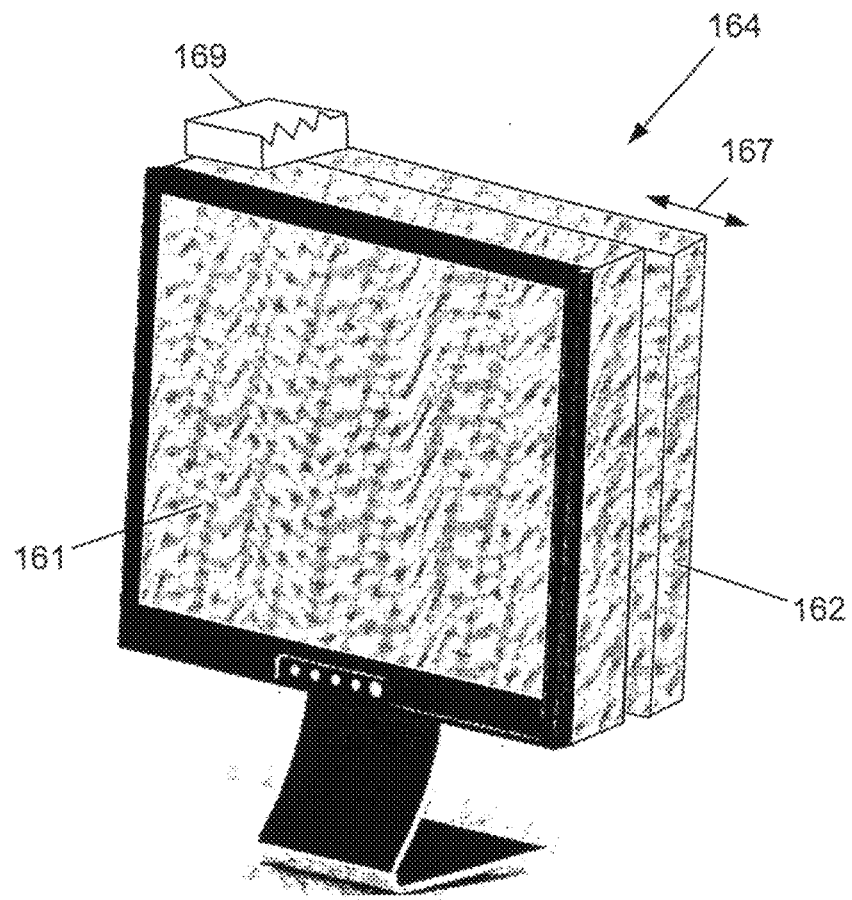
FIG. 9 is a perspective view of another embodiment of a computer monitor unit comprising a first stationary screen and a second axially slidable screen.

In FIG. 9, monitor unit 164 comprises a stationary first screen 161 and an oppositely facing second screen 162. Second screen 162 is axially slidable as shown by arrow 167 within a guide element 169, which is schematically shown in fragmented form and well known to those skilled in the art. Data may be transmitted to second screen by means of a flexible cable (not shown).

Figure 3:
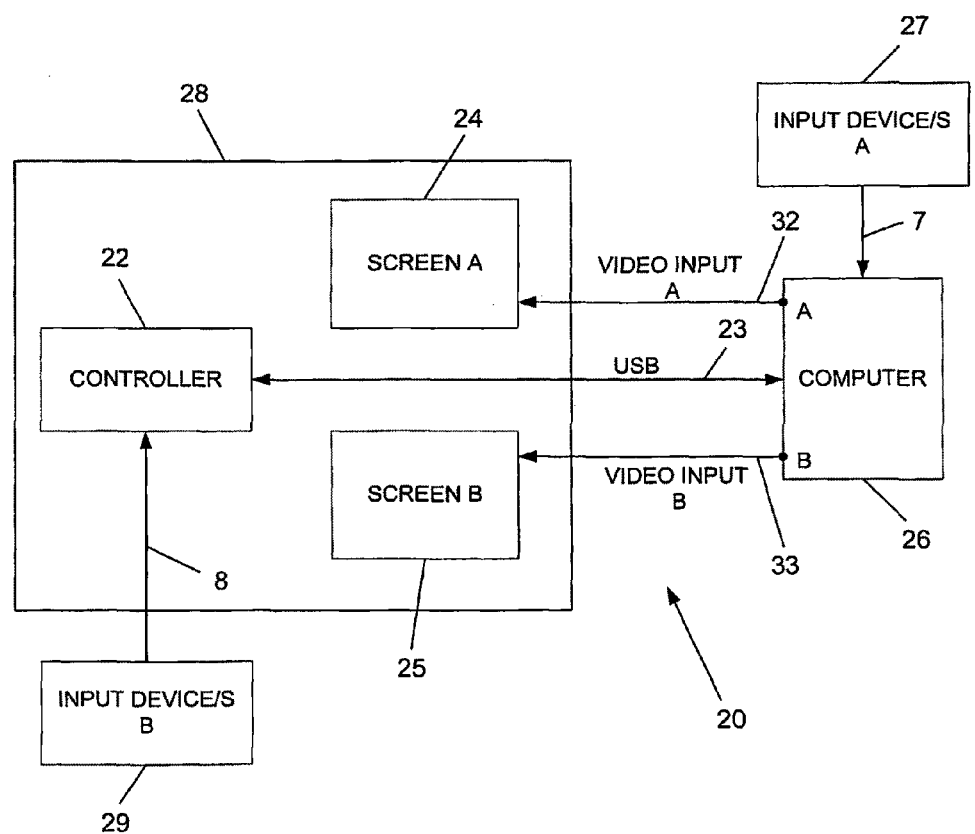
FIG. 3 is a block diagram of a digital multi-lateral proofreading system, according to one embodiment of the invention.

FIG. 3 illustrates a block diagram of a digital multi-lateral proofreading system, which is designated by numeral 20, according to one embodiment of the invention. Proofreading system 20 comprises multi-screen computer monitor unit 28 in which is housed monitor controller 22, and screens 24 and 25. Controller 22 is in data communication with computer 26 via Universal Serial Bus (USB) cable 23. External input device 27, i.e. spaced from the monitor housing, is coupled with computer 26 by cable 7 and is used by the primary co-author to proofread the composition displayed on screen 24, as is well known to those skilled in the art. After the signals originating from interaction with the primary co-author input device are received by computer 26, the software application of computer 26, which is active, is commanded to be changed in response to the received input device signals. The change in the software application in turn generates different image data, and the newly generated image data is transmitted to screens 24 and 25 via cables 32 and 33, respectively. Cables 32 and 33 are coupled with video input ports A and B, respectively, of computer 26 and with screens 24 and 25, respectively.

Input device 29 is coupled with controller 22 by cable 8 and is used by the secondary co-author to proofread the composition displayed on screen 25. It will be appreciated that system 20 is suitable for the interaction therewith of two secondary co-authors, and that each co-author may use more than one external input device provided with a corresponding cable, such as a keyboard and a mouse, in order to proofread a composition. Controller 22 is adapted to convert the signals generated by each interface device used by a secondary co-author into USB signals. In order to synchronize the generation and transmission of the USB signals from each input device, controller 22 is generally multi-channeled and is provided with a processor. After the USB signals originating from interaction with an input device are received by computer 26, the software application of computer 26, which is active, is commanded to be changed in response to the received USB signals. The change in the software application in turn generates different image data, and the newly generated image data is transmitted to screens 24 and 25 via cables 32 and 33, respectively. Thus input signals initiated by a primary or secondary input device generate image data which is displayable to both the primary and secondary co-author. External input devices are suitable for the multi-lateral proofreading of such compositions such as a literary work or a computer assisted drawing, for which colleagues work in unison to improve the content of the composition.

Some multi-lateral proofreading involves the combined effort of those that may be adversaries, such as a grantor and grantee that are preparing an agreement, or representatives thereof. With the use of the present invention, all of the proofreading and approval of the agreement may be carried out electronically, i.e. without having to print or sign any papers, thus providing considerable time savings to the sides participating in the meeting. Since an approved agreement bearing the electronic signature of the grantor and grantee has legal ramifications, the system of the present invention is therefore provided with means for verifying the identity of each co-author prior to initiating a proofreading operation. The identity verification means, in order to be integrated with the system, are embodied by additional input devices from which signals generated thereby are transmitted to the monitor unit controller. Identity verification means may be a credit card reader, biometric reader, electronic pen, a touch screen, or any other suitable means of identification.

Figure 4:
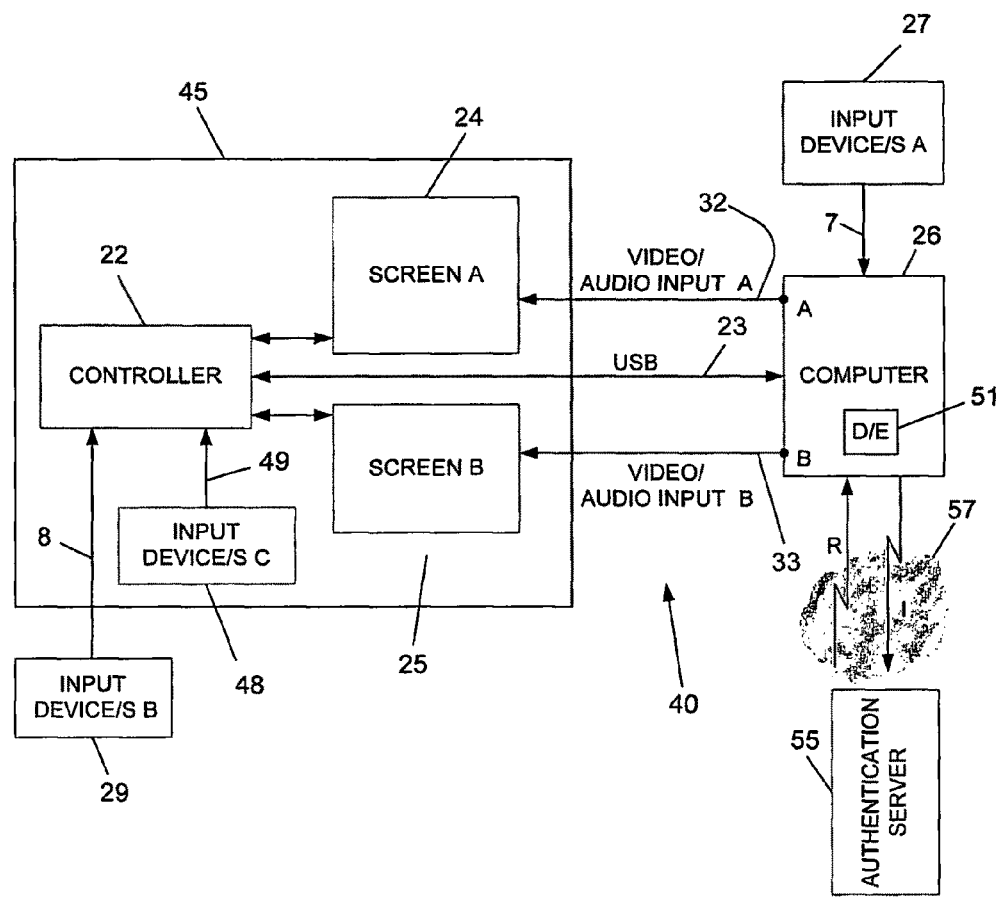
FIG. 4 is a block diagram of a digital multi-lateral proofreading system, according to another embodiment of the invention.

FIG. 4 illustrates a block diagram of a digital multi-lateral proofreading system 40 which comprises multi-screen computer monitor unit 45 in which is housed monitor controller 22, and screens 24 and 25. The connectivity and operation of computer 26 with respect to monitor unit 45 are similar to the description of FIG. 3, and therefore need not be repeated for brevity. The grantor and grantee interact with monitor unit 45 during a proofreading operation by means of external input devices 27 and 29, respectively, and by one or more integral input devices 48. An integral input device is one that cannot be detached from the housing of monitor unit 45. An example of an integral input device is a touch screen, which is of great utility to co-authors during a meeting. When one of the co-authors wants to discuss a displayed feature, the desired feature is pressed on the first side and indicated by a distinctive color or other indication means, and said feature is similarly indicated simultaneously on the second side. If so desired, the touch screen may be used for carrying out a proofreading operation.

Each integral input device 48 transmits signals generated thereby by corresponding wire 49 to controller 49. After computer 26 receives identification data from one of the input devices, such as following the intervention of controller 22, a signal I associated with the received identification data is securely transmitted to authentication server 55 via a suitable data network 57, e.g. the Internet. A database of identification data is stored in authentication server 55, and is categorized with respect to each type of identification data. The identification data is compared with the stored data of the same type and authentication thereof is determined, as well known to those skilled in the art. For example, biometric data input by one of the co-authors is compared with stored biometric data. If the received identification data is authenticated, a response signal R is transmitted from authentication server 55 to computer 26, whereby the disable/enable software module 51 embedded in the operating system of computer 26 is set to an enable mode, thereby allowing the co-author whose identification was authenticated to subsequently proofread or electronically sign the agreement, or any other composition displayed on the corresponding screen. After software module 51 is set to an enable mode, the software application of computer 26 which is active is commanded to be changed in response to the correction data that is transmitted by a co-author input device and received by computer 26. The change in the software application in turn generates different image data, and the newly generated image data is transmitted simultaneously to screens 24 and 25 via cables 32 and 33, respectively. Likewise, if authentication of the received identification data is denied, a response signal R is transmitted from authentication server 55 to computer 26, whereby the disable/enable software module 51 is set to a disable mode, preventing the corresponding co-author to participate in a proofreading operation.

Predetermined rules are stored in the microprocessor of controller 22 for determining which co-author, e.g. the grantor or grantee, has priority at a given time for performing a proofreading operation. The primary co-author, e.g. the grantor, has the privilege according to his discretion to set the secondary co-author input devices to a disabled mode, to prevent a selected draft of a composition from being changed. During the disabled mode, the input devices are prevented from transmitting correction data, but nevertheless permit the transmission of identification data, including the digital approval of a composition.

Figure 5:
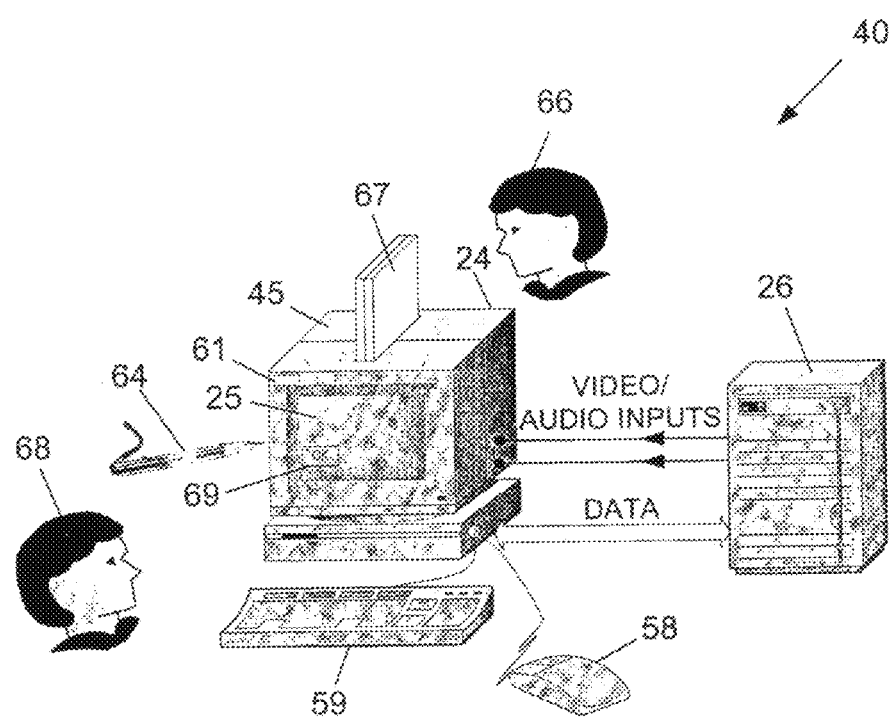
FIG. 5 is a schematic diagram of a digital multi-lateral proofreading system, illustrating exemplary input devices.

A co-author may be able to view images other those than of the selected composition being proofread by suitable manipulation of one of his input devices. FIG. 5 illustrates a schematic diagram of digital multi-lateral proofreading system 40, illustrating exemplary input devices. Grantor 66 and grantee 68 are shown to be viewing screens 24 and 25, respectively, of monitor unit 45. The external input devices include mouse 58, keyboard 59, and electronic pen 64. The integral input devices include biometric reader 61, magnetic card reader 67, e.g. a credit card reader, and touch screen 69. It will be appreciated that any combination of these input devices may be used for inputting correction data and identification data. Approval of an agreement, or any other composition, may be effected, for example, by pressing the "OK" icon of touch screen 69. A unique digital signature of grantor 66 and grantee 68, which is well known to those skilled in the art, is attached to the agreement, and is indicative that the content of the agreement has not been altered.

Figure 10:
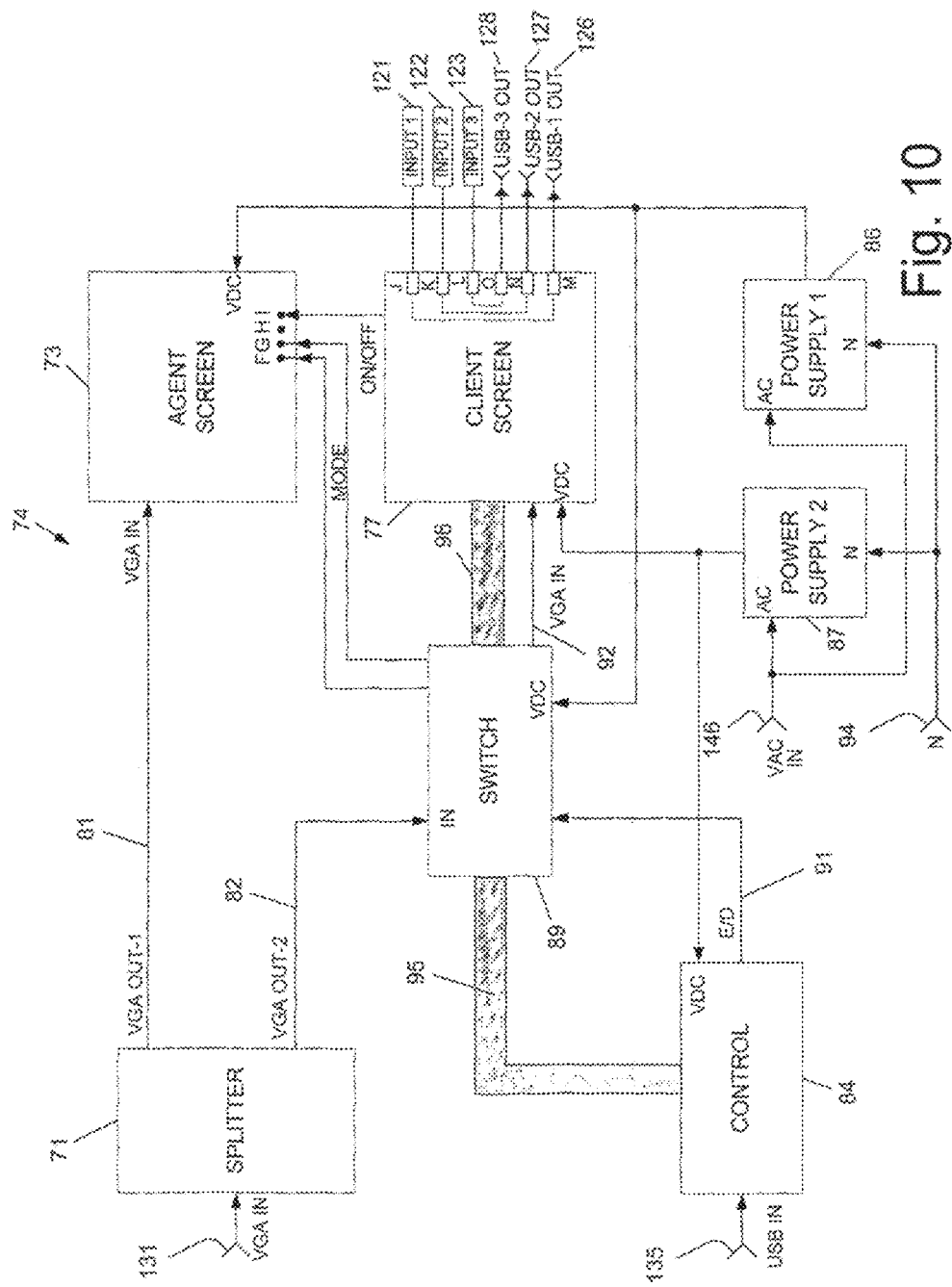
FIG. 10 is a block diagram of a digital multi-lateral proofreading system according to another embodiment of the invention.

In the embodiment of FIG. 10, a block diagram of a digital multi-lateral proofreading system 74 is illustrated. Proofreading system 74 is shown to comprise a monitor unit provided with two screens, e.g. liquid crystal diode (LCD) screens, agent side screen 73 and client side screen 77, but it will be appreciated that any other suitable number of screens is possible.

The multi-screened monitor unit of system 74 is a self contained unit that can interface with any conventional computer without having to change the hardware of the computer, and can be embodied by any of the configurations illustrated in FIGS. 1-2 and 6-9. As also illustrated in FIG. 6, the monitor unit is shown to have a video input port 131 transmitted thereto by means of e.g. a D-type connector 132 from the video port of the computer, an input port 135 from one of the universal serial bus (USB) ports of the computer as transmitted thereto by cable 140 and connector 143, and plug 146 for supplying alternating current voltage (VAC). Suitable circuitry, as will be described hereinafter, is provided with system 74 to allow operation in three different modes: (1) an agent only mode whereby images are displayed only on the agent side screen; (2) a uniform mode whereby the same images are displayed on both the agent and client sides; and (3) dual mode whereby different images are displayed on the agent and client side screens.

Proofreading system 74 comprises a video splitter 71, which receives video graphics array (VGA) data from the computer with which the monitor unit is coupled via input port 131 and splits the VGA data into two lines 81 and 82. Control module 84 controls the flow of USB data received from the computer with which the monitor unit is coupled via input port 135. Switch module 89 delivers video data to client side screen 77 in response to the operation of control module 84. The USB data may be control data for commanding switch module 89 or video data by which a composition is displayed on client side screen 77. Video splitter 71, control module 84 and switch module 89 may be arranged on a single card or on separate cards. Each of the cards may be positioned on a suitable surface of the monitor unit. Screens 73 and 77 are supplied direct current (DC) voltage, e.g. 12 VDC, from power supplies 86 and 87, respectively, which in turn are powered by VAC. Control module 84 and switch module 89 are also powered by DC voltage.

A software program dedicated to interface with the monitor unit and to generate the USB data delivered to input port 135, as well known to those skilled in the art, is stored within the computer. The software program has a standard interface for the operating system and allows limited manipulation thereof. The computer may also be provided with a network card coupled to the motherboard, to receive data transmitted over the network.

During the agent only mode, control module 84 generates a disable command D, which is transmitted to switch module 89 via line 91, and switch module 89 in response suppresses video data to client side screen 77. Therefore only agent side screen 73 displays images, in response to the VGA data delivered thereto via line 81.

During the uniform mode, control module 84 generates an enable command E transmitted to switch module 89 via line 91, and switch module 89 in response transmits the VGA data received via line 82 to client side screen 77. The VGA data is delivered via line 92 from switch module 89 to client side screen 77. Therefore screens 73 and 77 display the same images since identical VGA data is transmitted simultaneously through lines 81 and 82.

A multi-lateral proofreading operation is generally carried out during the uniform mode. In order to implement the multi-lateral proofreading operation, both the agent and client are each provided with a plurality of input devices. Each input device may be an external input device or an integral input device. The agent input devices, which are not shown, are coupled directly to the computer. Client input devices 121-123 are coupled to ports J-L, respectively, of client screen 77, or alternatively, of the monitor unit housing, and are adapted to generate USB data transmitted to the computer via cables 126-128, respectively. Cables 126-128 are coupled to ports M-O, respectively, of client screen 77, or alternatively, of the monitor unit housing. When the computer is located in a concealed room, such as in a bank, not being exposed to clients, such an arrangement advantageously allows client input devices to be quickly coupled to, and detached from, the monitor unit rather than to the computer. It will be appreciated, however, that the client input devices may also be coupled to the computer, or alternatively, may be in wireless communication with the computer by a suitable short range transceiver, e.g. a Bluetooth device. The dedicated software program of the computer receives the USB data and thereby generates corresponding video images.

The dedicated software program may be adapted to prevent an agent input device and a client input device to operate simultaneously during a multi-lateral proofreading operation. If, for example, an agent input device has input information to the computer with which it is in communication in order to modify a composition, all client input devices are disabled for a predetermined period of time, e.g. 10 seconds. Likewise if a client input device has input information to the computer with which it is in communication in order to modify a composition, all agent input devices are disabled for a predetermined period of time.

During the dual mode, agent side screen 73 displays one set of images which corresponds to the VGA data delivered to input port 131, while client side screen 77 displays a second set of images, such as composition images, which correspond to the USB data delivered to input port 135. Monitor unit 74 comprises a USB bus through which USB data is transmitted. The USB bus includes segment 95 connecting control module 84 to switch module 89 and segment 96 connecting switch module 89 with client side screen 77. When the USB data received at input port 135 is video data, control module 84 transmits the USB data via bus segment 95 and further transmits a disable signal D via line 91 to switch module 89, in order to suppress the transmission of the VGA data received via line 82. Switch module in turn transmits the USB data via bus segment 96. To enable the generation of the second set of images of client side screen 77, a second video card is coupled to the motherboard of the computer.

The agent may select a desired mode of operation by depressing a predetermined key on his keyboard, or by depressing a selected button on a dedicated panel. The panel may also be provided with a button for deactivating one of the power supplies 86 and 87. Upon depressing this button, a suitable control signal N is transmitted to junction 94 whereby the selected power supply is deactivated. The panel or agent side screen 73 may be provided with a plurality of indication devices F-I, such as light emitting diode (LED) lamps, for indicating the current mode of operation and which screen is activated.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A digital multi-lateral system for proofreading a composition during a meeting, comprising:
   a) a multi-screened monitor unit having a first screen and at least one oppositely facing second screen mounted in a common housing, images of a selected textual-content based composition being viewable simultaneously on said first screen and said at least one second screen;
   b) a computer coupled to said multi-screened monitor unit and provided with a dedicated software module installed thereon, said dedicated software module also being configured to interface between an operating system of said computer and said monitor unit;
   c) one or more primary co-author input devices by which a primary co-author is able to perform a proofreading operation while viewing said composition on said first screen, said one or more primary co-author input devices being coupled to said computer;
   d) one or more sets of secondary co-author input devices by which a corresponding secondary co-author is able to perform a proofreading operation while viewing said composition on a corresponding second screen during a meeting with the primary co-author; and
   e) means for transmitting signals generated by each of said secondary co-author input devices to said computer,
   wherein correction data of said textual-content is transmittable from said one or more sets of secondary co-author input devices to said dedicated software module, and from said dedicated software module to said operating system,
   wherein said operating system is adapted to transmit said correction data to an application running on said computer in order to generate corrected image data in response to said transmitted correction data and to transmit said corrected image data to said operating system, whereupon said operating system is adapted to generate video graphics array (VGA) data and universal serial bus (USB) video data from said corrected image data,
   wherein said monitor unit further comprises the following elements that are retained by said housing:
      i. a first input port for receiving USB control data and said USB video data from said operating system;
      ii. a second input port for receiving said VGA data from said operating system;
      iii. a control module for controlling the flow of said received USB control data and USB video data;
      iv. a video splitter for receiving said VGA data and for splitting said received VGA data into a first portion transmitted through a first line to said first screen and into a second portion transmitted through a second line;
      v. a USB/VGA selector switch module which has a first video input for inputting USB video data received from said control module, a second video input for inputting VGA video data received from said video splitter via said second line, and only a single video output, for selectively delivering, to said at least one second screen via said video output, said received USB video data at a first given time and said received VGA video data at a second given time in response to the control data generated by said control module; and,
      vi. at least one USB output port through which USB data including said correction data generated by a corresponding secondary co-author input device is transmitted to said operating system via said dedicated software module, wherein said monitor unit is operable, upon selection by the primary co-author, in an agent only mode whereby images are viewable on the first screen but not on the at least one second screen, in a uniform mode whereby the first screen and the at least one second screen display the same images associated with said received VGA data, or in a dual mode whereby the first screen displays images associated with said received VGA data and the at least one second screen displays images associated with said received USB video data, wherein said dedicated software module, upon input by the primary co-author, is adapted to disable said one or more sets of secondary co-author input devices during the uniform or dual mode.

2. The system according to claim 1, wherein the monitor unit is a kit which is releasably coupleable with the computer.

3. The system according to claim 1, further comprising means for preventing a primary co-author input device and a secondary co-author input device to operate simultaneously during the uniform mode of a multi-lateral proofreading operation.

4. The system according to claim 1, wherein the control module is further adapted to convert signals generated by a secondary co-author input device into USB signals transmitted to the computer.

5. The system according to claim 1, wherein the monitor unit further comprises a first USB segment extending from the control module to the switch module, and a second USB segment extending from the switch module to the second screen.

6. The system according to claim 1, further comprising means for identifying each of the co-authors.

7. The system according to claim 6, further comprising an authentication server with which the computer is in data communication, for authenticating a co-author identification, and means for disabling a proofreading operation if a co-author identification is not authenticated.

8. The system according to claim 7, further comprising means for attaching a digital signature to an approved composition.

9. The system according to claim 1, wherein a primary or secondary co-author input device is an input device which is external to the monitor unit.

10. The system according to claim 1, wherein a primary or secondary co-author input device is an input device which is integral with the monitor unit.

11. The system according to claim 10, wherein the integral input device is a touch screen, and the transmitted corrected image data is a displayed feature of the composition which is indicated by means of the touch screen.

12. The system according to claim 1, wherein one of the secondary co-author input devices is coupled to the monitor unit, or to the computer.

13. The system according to claim 1, wherein a secondary co-author input device is in wireless communication with the computer.

14. The system according to claim 1, wherein correction data of the textual content is also transmittable from the one or more primary co-author input devices to the dedicated software module, and from the dedicated software module to the operating system.

15. A method for the digital multi-lateral proofreading of a composition during a meeting, comprising:
   a) providing a multi-screened monitor unit having a first screen viewable by a primary co-author and at least one oppositely facing second screen viewable by corresponding secondary co-authors, said first and second screens being mounted in a common housing;
   b) coupling said monitor unit to a computer provided with a dedicated software module installed thereon, said dedicated software module being configured to interface between an operating system of said computer and said monitor unit;
   c) receiving from said computer, at a first input port of said monitor unit, USB control data and USB video data;
   d) receiving from said computer, at a second input port of said monitor unit, VGA data;
   e) controlling the flow of said received USB control data and USB video data;
   f) inputting said received USB video data and said received VGA video data in parallel to a USB/VGA selector switch module housed in said monitor unit;
   g) selectively delivering via only a single video output of said USB/VGA selector switch module to said at least one second screen in response to said received USB control data, said received USB video data at a first given time and said received VGA video data at a second given time;
   h) commencing a dual mode initiated by the primary co-author in conjunction with said dedicated software module, whereby the at least one second screen displays images corresponding to said received USB video data and the first screen displays images corresponding to said received VGA data that are different images than those displayed on the at least one second screen;
   i) simultaneously viewing images of a same selected textual-content based composition during a meeting by a co-author on each corresponding screen of said monitor unit;
   j) simultaneously performing a proofreading operation by the primary co-author and the at least one secondary co-author, whereby correction data of said textual-content is transmitted from a corresponding input device of one or more of said secondary co-authors to said dedicated software module and from said dedicated software module to said operating system;
   k) generating corrected image data by said operating system in response to said transmitted correction data; and
   l) transmitting said corrected image data to said first and at least one second screens via said dedicated software module.

16. The method according to claim 15, further comprising the step of commencing an agent only mode initiated by the primary co-author, whereby images are not displayed on the at least one second screen.

17. The method according to claim 15, further comprising the step of commencing a uniform mode initiated by the primary co-author whereby the first screen and the at least one second screen display the same images and a proofreading operation is simultaneously performed by the primary co-author and the at least one secondary co-author.

18. The method according to claim 17, wherein all secondary co-author input devices are disabled for a predetermined period of time after a primary co-author input device has performed a proofreading operation, and all primary co-author input devices are disabled for a predetermined period of time after a secondary co-author input device has performed a proofreading operation.

19. The method according to claim 18, wherein the primary co-author is a grantor and the secondary co-author is a grantee.

20. The method according to claim 17, further comprising the step of disabling a secondary co-author input device by the primary co-author during the uniform mode.

21. The method according to claim 15, wherein the corrected image data is transmitted simultaneously to the first and at least one second screens.

22. The method according to claim 15, further comprising the step of simultaneously performing the proofreading operation by the primary co-author and the at least one secondary co-author in the dual mode, whereby correction data is transmitted from a corresponding input device of the primary co-author to said computer.

23. The method according to claim 15, wherein the proofreading operation includes correction of misprints, inaccurate statements and deleted statements.

24. A multi-screened computer monitor unit self contained within a housing and which is capable of being coupled to a single computer, comprising:
   a) a first screen;
   b) at least one oppositely facing second screen;
   c) a first input port for receiving USB control data and USB video data received from a single computer;
   d) a control module for controlling the flow of the USB control data and the USB video data received from said first input port;
   e) a second input port for receiving VGA data from the computer;
   f) a video splitter for splitting the received VGA data into a first portion transmitted through a first line to said first screen and into a second portion transmitted through a second line;
   g) a USB/VGA selector switch module which has a first video input for inputting USB video data received from said control module, a second video input for inputting VGA video data received from said video splitter via said second line, and only a single video output by which is selectively delivered, said received USB video data at a first given time and said received VGA video data at a second given time, to each of said second screens in response to the control data generated by said control module;
   h) a first USB segment extending from said control module to each of said switch modules;
   i) a second USB segment extending from each of said switch modules to a corresponding second screen;
   j) means for selecting a desired mode of operation, corresponding USB control data being transmittable to said control module upon selection of the desired mode of operation; and
   k) for each corresponding second screen, a set of one or more output ports, from each of said output ports are transmittable USB signals generated by a client input device in data communication with said monitor unit to the computer,
      wherein said control module is adapted to generate a disable signal and to transmit the same to said switch module during an agent only mode to suppress the transmission of the VGA data via said second line,
      wherein said control module is adapted to generate an enable signal and to transmit the same to said switch module during a uniform mode to enable the transmission of the VGA data via said first and second lines simultaneously,
      wherein said control module is adapted to generate a disable signal and to transmit the same to each of said switch modules during a dual mode, the USB video data being transmittable via the first USB bus segment and each of second USB bus segments to each of said corresponding second screens, respectively, images associated with said VGA data and with said USB video data being simultaneously displayable on said first and second screens, respectively.

25. The monitor unit according to claim 24, wherein the first screen is stationary and the second screen is displaceable.

26. The monitor unit according to claim 24, wherein the second screen is angularly spaced from the first screen.

* * * * *